United States Patent
Kimberlin

[11] Patent Number: 5,839,375
[45] Date of Patent: Nov. 24, 1998

[54] APPARATUS FOR BURNING ORGANIC MATERIAL

[76] Inventor: John R. Kimberlin, 3338 UTE Ave., Waukee, Iowa 50263

[21] Appl. No.: 626,761

[22] Filed: Apr. 2, 1996

[51] Int. Cl.[6] .................................................... F23G 5/00
[52] U.S. Cl. ........................ 110/235; 110/196; 110/242; 110/297; 110/317; 126/71; 126/109; 126/224
[58] Field of Search ..................................... 110/196, 235, 110/242, 297, 317; 126/224, 70, 71, 109

[56] References Cited

U.S. PATENT DOCUMENTS

| | | | |
|---|---|---|---|
| 244,051 | 7/1881 | Hall | 110/196 |
| 272,453 | 2/1883 | Michener | 110/196 |
| 297,170 | 4/1884 | Rumely | 110/196 |
| 523,672 | 7/1894 | Long | 126/109 |
| 617,657 | 1/1899 | Robinson | 126/70 |
| 1,086,366 | 2/1914 | Hirt | 110/235 |
| 1,328,246 | 1/1920 | Merry | 126/70 |
| 1,344,668 | 6/1920 | Young | 110/196 |
| 1,566,608 | 12/1925 | Kruse . | |
| 1,798,362 | 3/1931 | Bean | 126/224 |
| 2,493,939 | 1/1950 | Ames | 110/18 |
| 3,022,753 | 2/1962 | Montgomery | 110/235 |
| 3,044,460 | 7/1962 | Hoskinson | 110/235 |
| 3,664,278 | 5/1972 | Steen | 110/254 |
| 4,127,100 | 11/1978 | Baker | 126/110 B |
| 4,128,094 | 12/1978 | Lewis | 126/110 B |
| 4,180,052 | 12/1979 | Henderson | 126/108 |
| 4,206,743 | 6/1980 | Niemela | 126/110 B |
| 4,215,743 | 8/1980 | Margittai | 165/141 |
| 4,218,980 | 8/1980 | Probsteder | 110/196 |
| 4,265,214 | 5/1981 | Rasmussen | 126/77 |
| 4,289,079 | 9/1981 | Swistun | 110/255 |
| 4,291,633 | 9/1981 | Hoskinson | 110/235 |
| 4,308,034 | 12/1981 | Hoang | 48/111 |
| 4,350,139 | 9/1982 | Robichaud | 126/77 |
| 4,359,006 | 11/1982 | Have | 110/346 |
| 4,449,510 | 5/1984 | Sukup | 126/99 A |
| 4,461,242 | 7/1984 | Black | 122/15 |
| 4,471,702 | 9/1984 | McKinlay | 110/210 |
| 4,493,270 | 1/1985 | Gamroth | 110/188 |
| 4,597,375 | 7/1986 | Pabis | 126/117 |
| 4,685,441 | 8/1987 | Yanko | 126/116 R |
| 4,732,090 | 3/1988 | Bollmann, Sr. et al. | 110/196 |
| 4,750,454 | 6/1988 | Santina et al. | 123/3 |
| 5,245,936 | 9/1993 | Nakata | 110/251 |
| 5,297,729 | 3/1994 | Scullion | 237/53 |

FOREIGN PATENT DOCUMENTS

| | | | |
|---|---|---|---|
| 75803 | 3/1919 | Austria | 126/224 |
| 2178913 | 11/1973 | France . | |
| 359113 | 1/1920 | Germany | 126/224 |
| 2 317 441 | 10/1974 | Germany . | |
| 33 27 662 A1 | 2/1985 | Germany | 110/196 |
| 36 12 059 A1 | 10/1987 | Germany | 110/196 |
| 402-230009 | 9/1990 | Japan | F23G 5/00 |
| 2 059 560 | 4/1981 | United Kingdom . | |

*Primary Examiner*—Ira S. Lazarus
*Assistant Examiner*—Ljiljana V. Ciric
*Attorney, Agent, or Firm*—Zarley, McKee, Thomte, Voorhees & Sease

[57] ABSTRACT

An apparatus and method for burning organic farm bedding waste includes a firebox having an air injector disposed within the firebox. A heat exchanger is also disposed within the firebox above the air injector. The fuel to be burned, a mixture of organic farm bedding waste, is piled in the firebox surrounding the air injector and heat exchanger. By injecting air into the pile of fuel, the fuel is burned from the inside out, surrounding the heat exchanger with the burning fuel. The unburned fuel acts to insulate the burning fuel from the walls of the firebox. The apparatus can be used as an incinerator or as a furnace to heat a building.

28 Claims, 8 Drawing Sheets

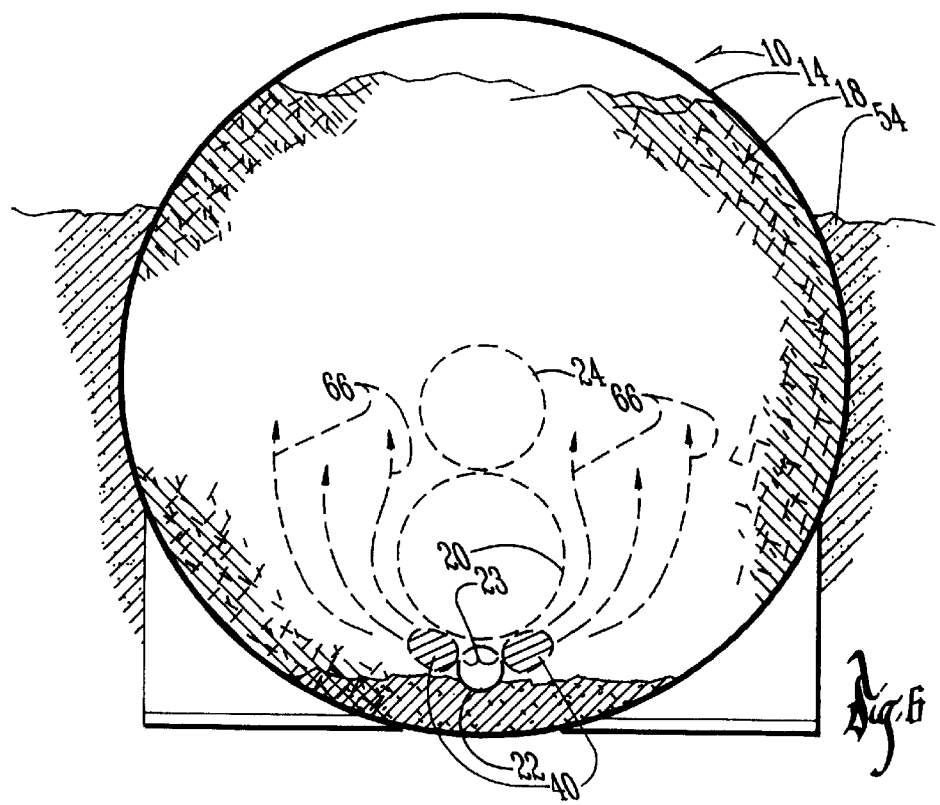
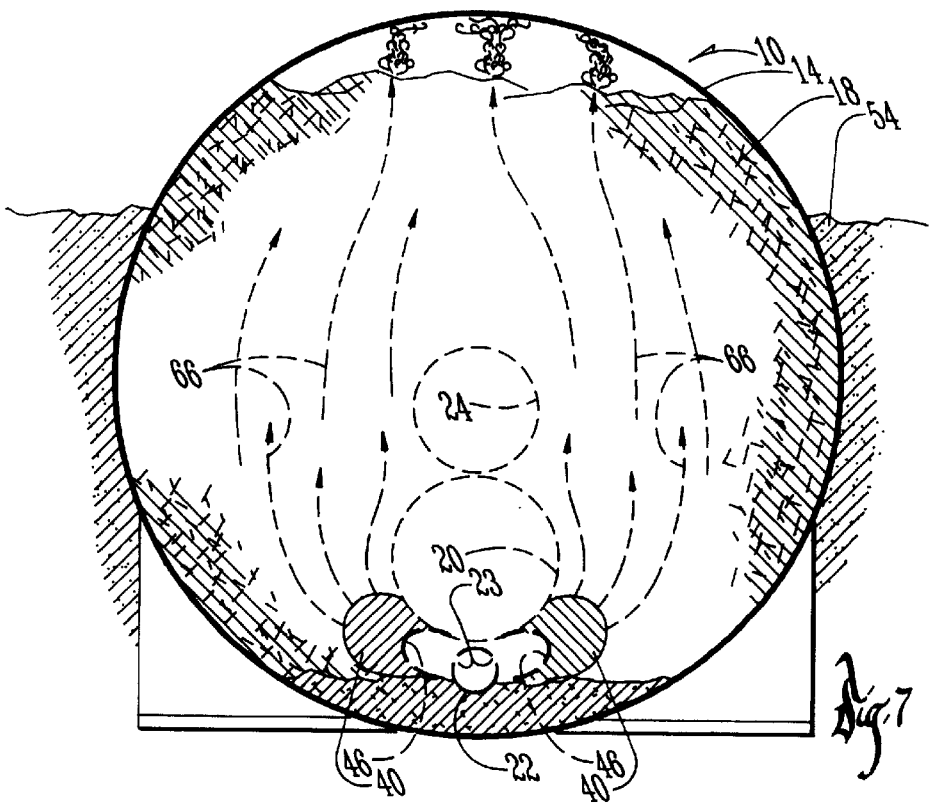

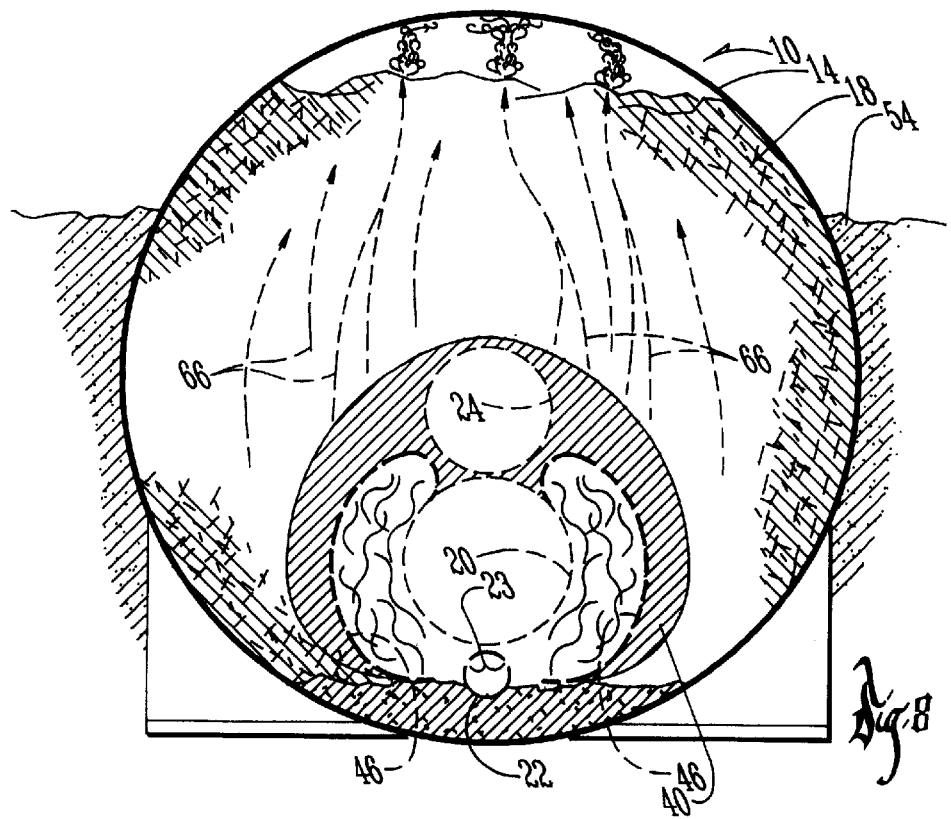
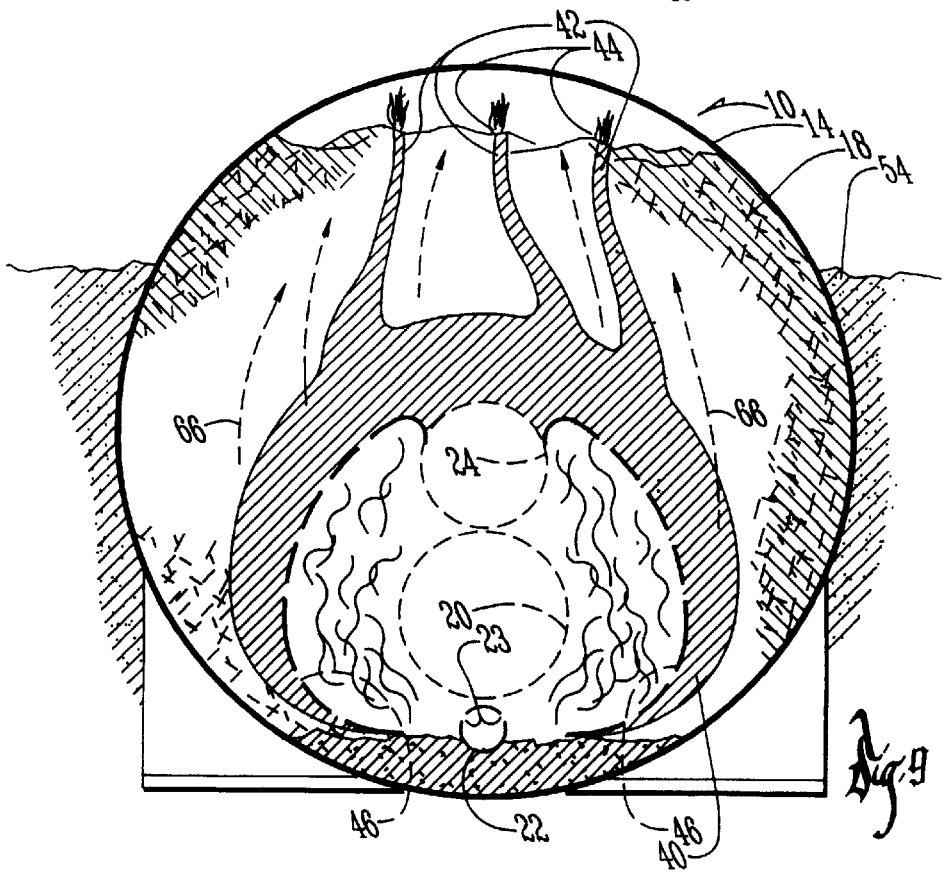

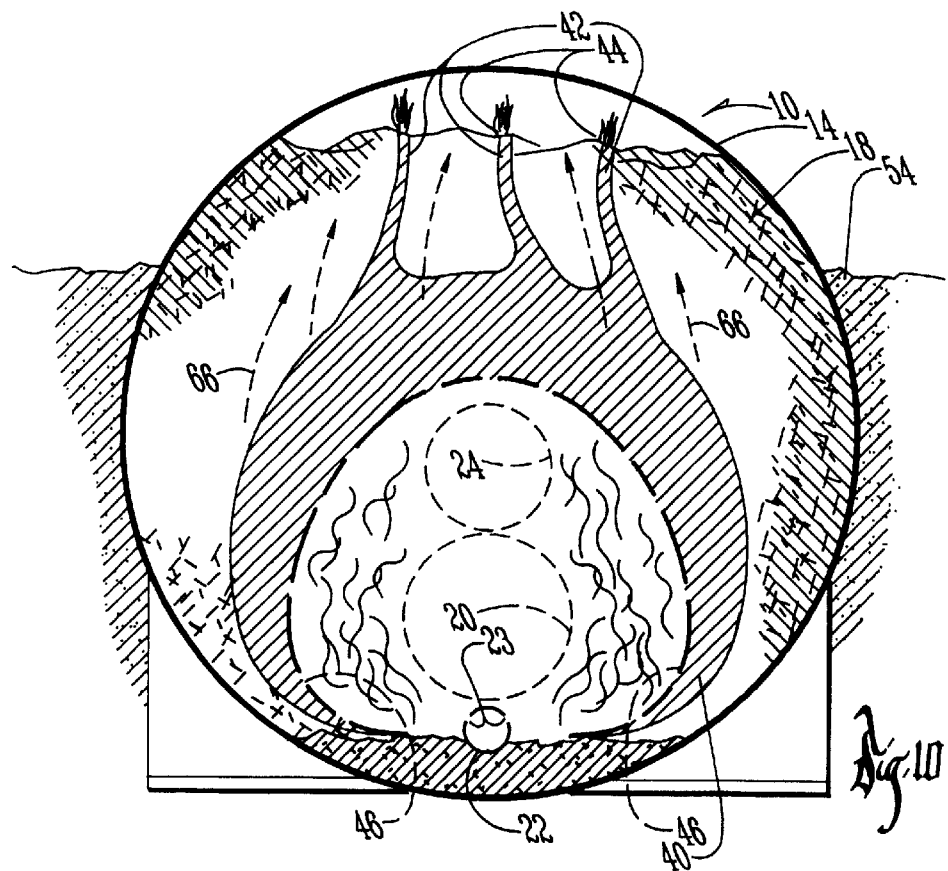
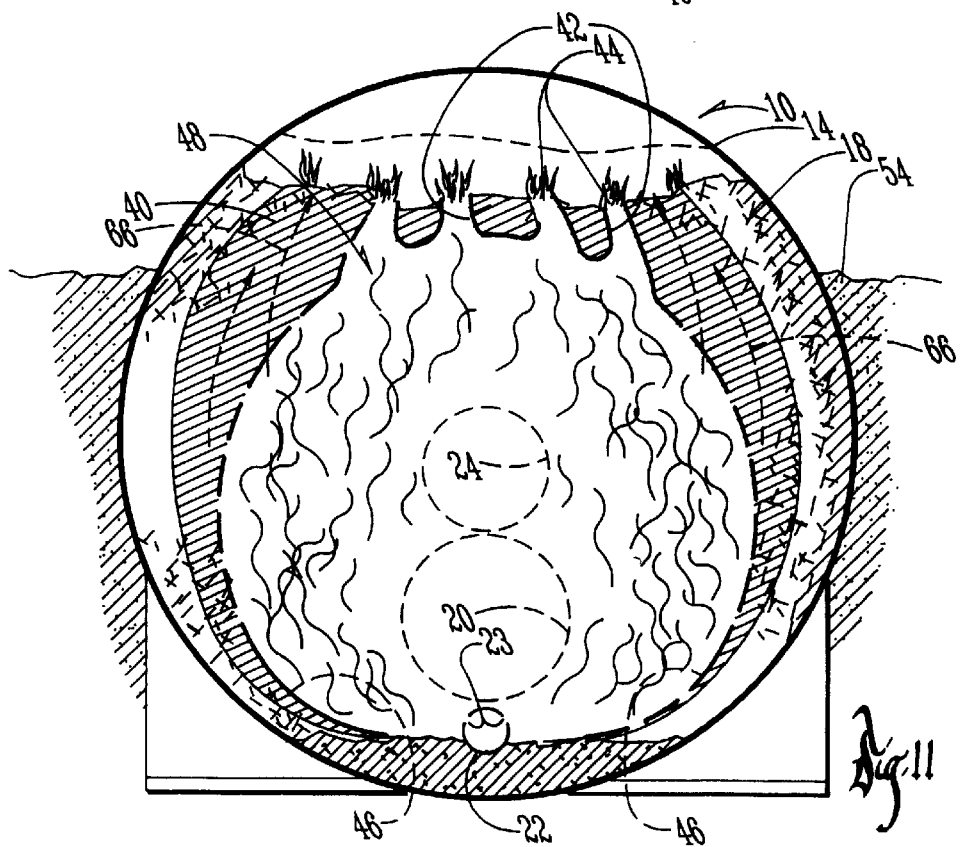

APPARATUS FOR BURNING ORGANIC MATERIAL

BACKGROUND OF THE INVENTION

1. Field of the Invention

The present invention relates to organic waste disposal. More particularly, though not exclusively, the present invention relates to an apparatus and method for burning organic farm bedding waste.

2. Problems in the Art

A significant problem exists in the livestock field with the removal and disposal of animal manure and bedding. For example, a farmer or horse trainer will typically bed a livestock stall by periodically spreading 6–8 inches of bedding material over the floor of the stall. The bedding and animal waste is then periodically removed from the stall and piled outside of the barn. The cost of animal waste and bedding removal and disposal is significant. For example, at the three week All American Quarter Horse Congress in Columbus, Ohio, approximately 2.7 million cubic feet of manure must be removed and disposed of each year. This results in a cost of over $200,000.00 per year to dispose of the waste. Both small and large operations experience the same problems with waste removal and disposal.

The most common prior art method of disposing of animal waste is by spreading the manure over a field. Spreading manure over a field has several disadvantages. First, the hauling costs and time required are high. Also, the manure increases the acidity of the soil in the field. Other problems in the field can occur from weed seeds in the manure. Weed seeds from either the animal bedding or feed will be present in manure and will contaminate the field with unwanted weeds. Finally, the manure will host a number of unwanted parasites and disease carrying bacteria which can harm farm animals or cause farm animals to get diseases such as sleeping sickness, for example.

It is also becoming more common to dispose of animal waste at local landfills which are already near their capacities.

There are systems for burning organic animal waste to dispose of such waste. The most common is simply burning a pile of waste. Since animal bedding waste burns like a silage fire, the pile of manure will burn slowly and will smolder for months. Also, a pile of animal waste will burn at a relatively low heat which causes undesirable odors. Burning this waste material in a fireplace or furnace also has undesirable results. First, the waste must be dry before it will burn in a fireplace or furnace. Second, when the waste does burn, it does so slowly and inefficiently.

Another problem found in the livestock field is the high expense of heating farm buildings such as horse barns or indoor arenas used for training horses. If a farmer needs to heat a farm building the cost is quite high using conventional furnaces or heating methods. In addition, these furnaces or methods usually burn fossil fuels or use electricity which is generated using primarily fossil fuels. Burning fossil fuels is expensive and pollutes the air. For example, to heat a typical 15 stall horse barn located in the Midwest may cost the farmer $1,500 or more per year. A typical prior art wood or coal burning furnace for heating a farm building is also expensive and complex. A typical wood burning furnace will have a fire box encasing the fuel to be burned. Since the walls of the wood burning furnace are directly exposed to the burning fuel, the structure of the furnace must withstand this extreme heat. Also, the outer walls of the furnace will become extremely hot which creates a hazardous situation for people and animals working near the furnace, especially children.

It can therefore be seen that there is a need for an effective way to dispose of organic farm bedding waste and also for a more effective and more economical method of heating a farm building.

FEATURES OF THE INVENTION

A general feature of the present invention is the provision of an apparatus and method for disposing of organic farm bedding waste which overcomes the deficiencies found in the prior art.

A further feature of the present invention is the provision of an apparatus and method for disposing of organic farm bedding waste which injects air into the waste causing the waste material to burn from the inside out creating a chamber within the waste which substantially surrounds a heat exchanger resulting in an effective and efficient apparatus and method.

Further features and advantages of the present invention include;

An apparatus and method for burning organic farm bedding waste which burns the waste from the inside out allowing the unburned waste to insulate the walls of the furnace from the fire.

An apparatus and method for burning organic farm bedding waste which provides an effective method of disposing of the waste as well as a means for economically heating a building.

An apparatus and method for burning organic farm bedding waste which allows the user to put wet organic farm bedding waste into the apparatus.

An apparatus and method for burning organic farm bedding waste which reduces fossil fuel consumption and pollution.

These as well as other objects, features and advantages of the present invention will become apparent from the following specification and claims.

SUMMARY OF THE INVENTION

The present invention relates to a method and apparatus for burning organic farm bedding waste. An air injector is provided near the bottom of a combustion space with a heat exchanger located near the air injector. A fuel mixture to be burned is piled over the heat exchanger and air injector. Oxygen is then injected into the pile of fuel causing the fuel to burn from the inside out substantially surrounding the heat exchanger with burning fuel. The invention may optionally be used to heat a building.

BRIEF DESCRIPTION OF THE DRAWINGS

FIG. 5 is an enlarged partial cross section taken along lines 5—5 of FIG. 2.

FIGS. 6–13 are cross sections similar to FIGS. 3 and 4 showing various stages of burning using the present invention.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
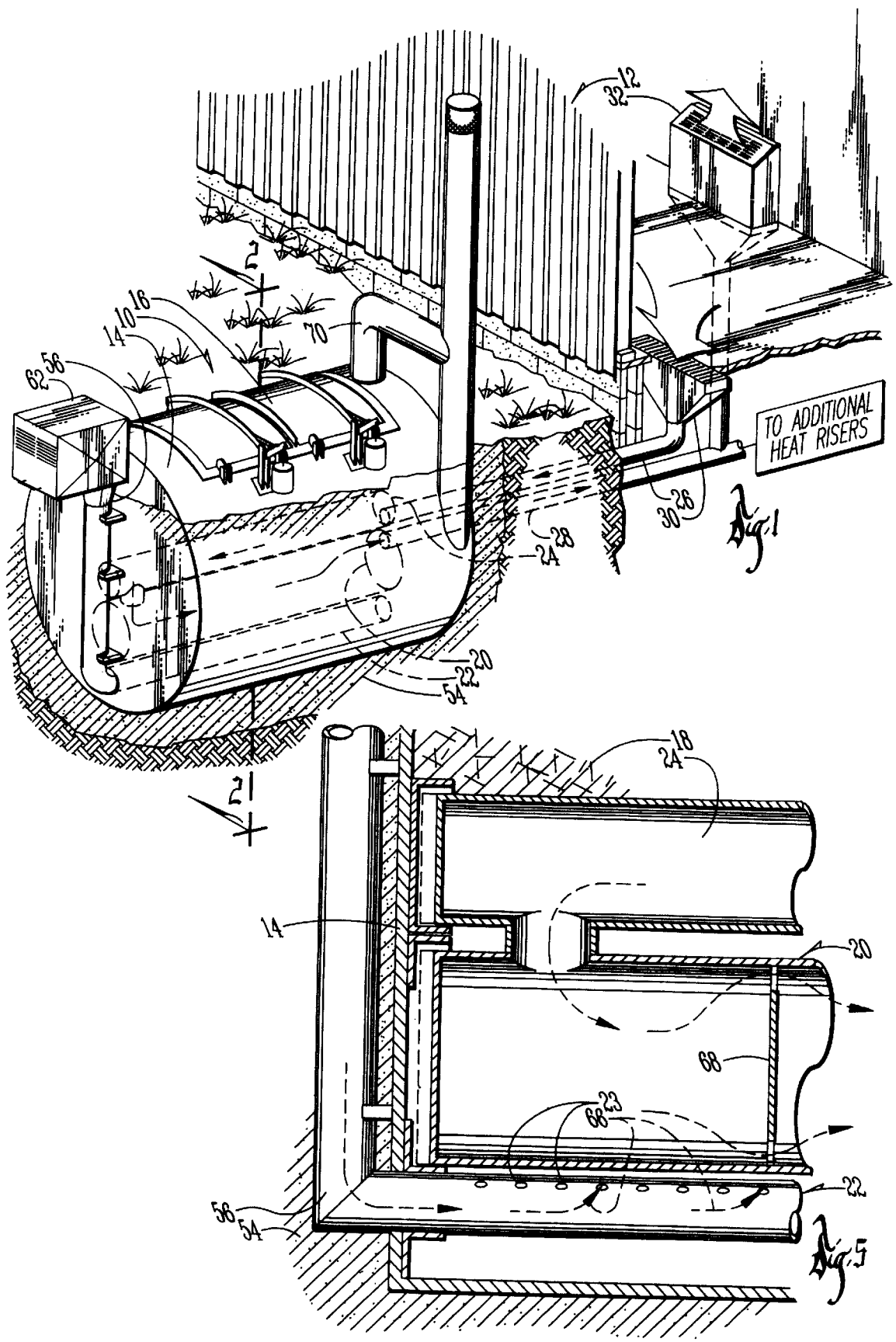
FIG. 1 is a perspective view of an embodiment of the present invention being used to heat a building.

FIG. 1 shows an apparatus for burning organic farm bedding waste of the present invention. FIG. 1 includes a furnace 10 buried partially in the ground next to a building 12. FIGS. 2–5 show the furnace 10 in more detail. The furnace 10 includes a cylindrical fire box 14 having two ends. The firebox 14 is preferably made from thick iron. A door 16 is disposed on top of the fire box 14 and opens and closes about hinges 16A. A heat exchanger 20 is located within the firebox. Having the heat exchanger 20 within the firebox 14 is advantageous. With the door 16 open, a quantity of fuel 18 can be dumped into the fire box 14 surrounding the heat exchanger 20, an air injector pipe 22, and a cold air pipe 24. The cold air pipe 24 is connected to a cold air return 26 which is ultimately connected to a cold air return input 30 located within the building 12. The heat exchanger 20 is connected to a hot air pipe 28 which carries hot air from the heat exchanger 20 to a register 32 located within the building 12. The register 32 includes a fan for circulating the air from the heat exchanger 20 through the building 12 and back through the cold air return input 30 to the heat exchanger 20. In this way, the cold air within building 12 enters the cold air return input 30, is heated by the heat exchanger 20, and is circulated back into the building 12 through the register 32.

The present invention is used to burn organic farm bedding waste and the like. The waste could be comprised of various suitable materials. In one example, the farm bedding waste is comprised of animal waste mixed with sawdust which is used to bed the animals'stalls. This mixture is mixed in the animal stalls simply by the animals walking through the stalls. Alternatively, the materials could be mixed elsewhere or even within the furnace. It was discovered that certain types of organic waste will burn in a very unusual and unexpected way if subjected to the right conditions. It was also discovered that air containing oxygen into a pile of smoldering waste causes the fuel to burn in the unusual and unexpected way.

FIGS. 6–13 show various stages of burning fuel used with the present invention. It is believed that FIGS. 6–13 all show cross-sectional views of what it looks like inside the firebox 14 throughout the burning process. The heat exchanger 20 and cold air pipe 24 are shown by the dashed lines. FIG. 6 shows the beginning of the burning cycle after the firebox is filled with the fuel mixture 18 (animal waste and sawdust). Prior to filling the firebox 14 with fuel 18, a layer of about 6 inches is ignited. This could be done using camp fire starter coals or the like. Alternatively, the furnace 10 could include an igniter. Other ways are possible. The fuel 18 is then piled into the firebox 14 as shown in FIG. 6. As air (which includes oxygen) is injected through the air injector pipe 22 into the fuel 18 via the air injector holes 23, the fuel near the holes 23 begins to burn. The holes 23 are located in the air injector pipe 22 such that they guide the injected air into the firebox in the directions shown in the figures. Other configurations are possible.

FIG. 6 shows the beginning of the burning process. The shaded areas 40 in FIG. 6 show fuel 18 which has started to burn near the air injector holes 23. The arrows 66 shown in the Figures show the escape of exhaust gasses through the fuel 18.

Once the fuel 18 begins to burn, an unusual phenomenon takes place. As shown in FIG. 7, as the burning continues, a bridging effect occurs forming a pair of cylindrical burning patterns as shown by the lines 46 in FIG. 7. At this stage, the fuel 18 does not collapse but rather bridges over a void forming a pair of cylindrical voids (like tunnels) in the fuel 18 around the air injector pipe 22. This results in a very concentrated fire with flames emanating from the fuel around the air injector pipe 22. Depending on the uniformity of the fuel and other factors, the bridging may start with secondary bridging occurring at different places along the air injector pipe 22. In other words, at the beginning of the burning process, various pockets may be formed along the air injector pipe 22 before the pair of cylindrical voids are formed as shown in FIG. 7.

FIG. 8 shows the beginning of the establishment of a cylindrical burn around the heat exchanger shown by lines 46. A layer of fuel 40 is shown burning and producing flames emanating from lines 46 which start to form a pair of kidney-shaped burns around the heat exchanger. Again, the areas enclosed by lines 46 are actually void of fuel or any other material. As shown in FIG. 8, the cylindrical burning has mostly surrounded the heat exchanger 20 and partially surrounds the cold air pipe 24. The cylindrical burning increases as more fuel is burned away.

FIG. 9 shows a further stage in the burning process. The flames emanating from lines 46 forming the pair of kidney-shaped burns are now mostly surrounding the cold air pipe 24. At this stage, a full cylindrical burn is almost established.

FIG. 10 shows the next stage in the burning process. In this stage, a true cylindrical burn is established shown by lines 46. A layer of fuel 40 is burning and producing flames emanating from line 46 which completely surround the heat exchanger 20 and the cold air pipe 24. During this stage, small air passageways 42 are also formed to release exhaust gases from the flames 40. These air passageways 42 terminate at exhaust port holes 44 formed in the fuel 18. In relation to the flames at line 46, the exhaust port holes 44 are relatively small. The size of the exhaust port holes depends on various factors including the make-up of the fuel and the amount of air injected through the holes 23.

FIG. 10 shows the optimum stage of the present invention (FIGS. 8 and 9 may also be the optimum stage). As shown in FIG. 10, nearly the entire heat produced by the burning fuel 40 is exposed to the heat exchanger and the cold air pipe 24. The remaining fuel 18 which is unburned acts to insulate the heat produced by the flames from the outside walls of the firebox 14. Because of the make-up of the fuel 18, the fuel 18 is a very good thermal insulator. As a result, the exterior of the firebox 14 remains relatively cool while the cylindrical void surrounding the heat exchanger 20 contains nearly all of the heat produced by the flames 40. The firebox 14 will have only a few small hot spots where the exhaust port holes 44 are formed. For example, in FIG. 10, the walls of the firebox 14 will be relatively cool with small hot spots directly above the exhaust port holes 44.

FIG. 11 shows a further stage of burning. As shown in FIG. 11, the bridging of the fuel 18 begins to collapse at this point. While the burning fuel 40 still produces flames emanating from lines 46 in a nearly cylindrical burn surrounding the heat exchanger 20 and the cold air pipe 24, the upper end of the cylinder comprised of fuel 18 starts to become thin and weak.

Figure 12:
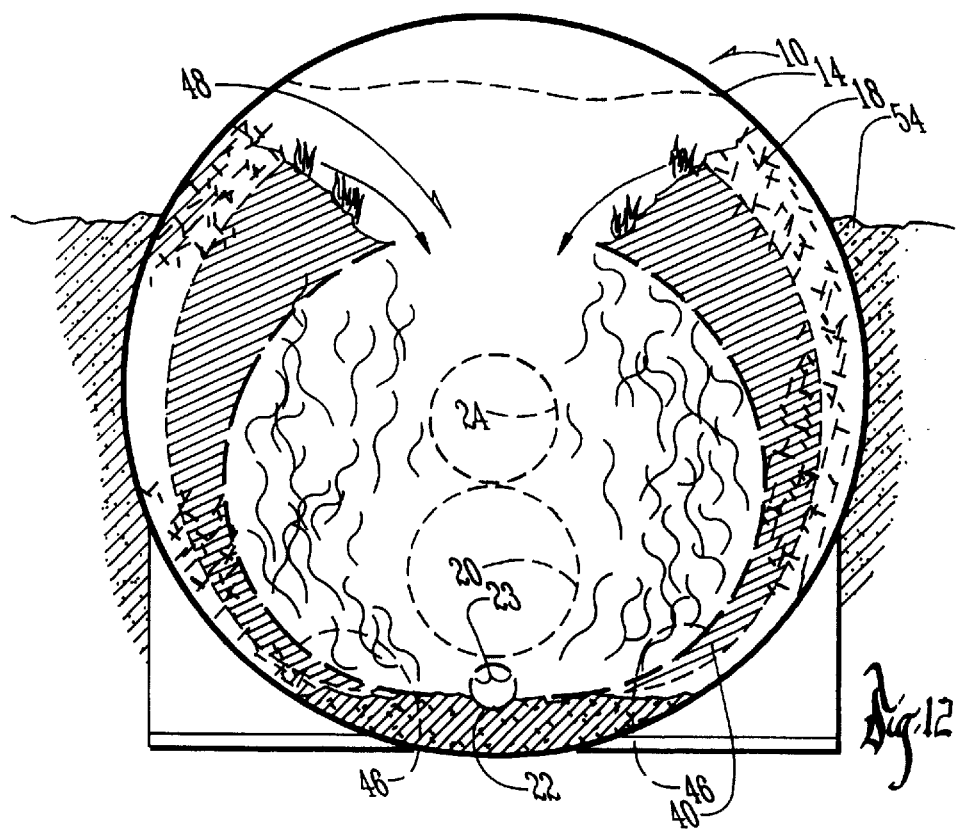

FIG. 12 shows the beginning of a collapse of the cylindrical void. As shown in FIG. 12, the burning fuel 40 is still burning creating flames emanating from lines 46 shaped generally in a cylindrical burn surrounding the heat exchanger 20 and cold air pipe 24, although an opening 48 is formed as the top of the cylinder collapses.

Figure 13:
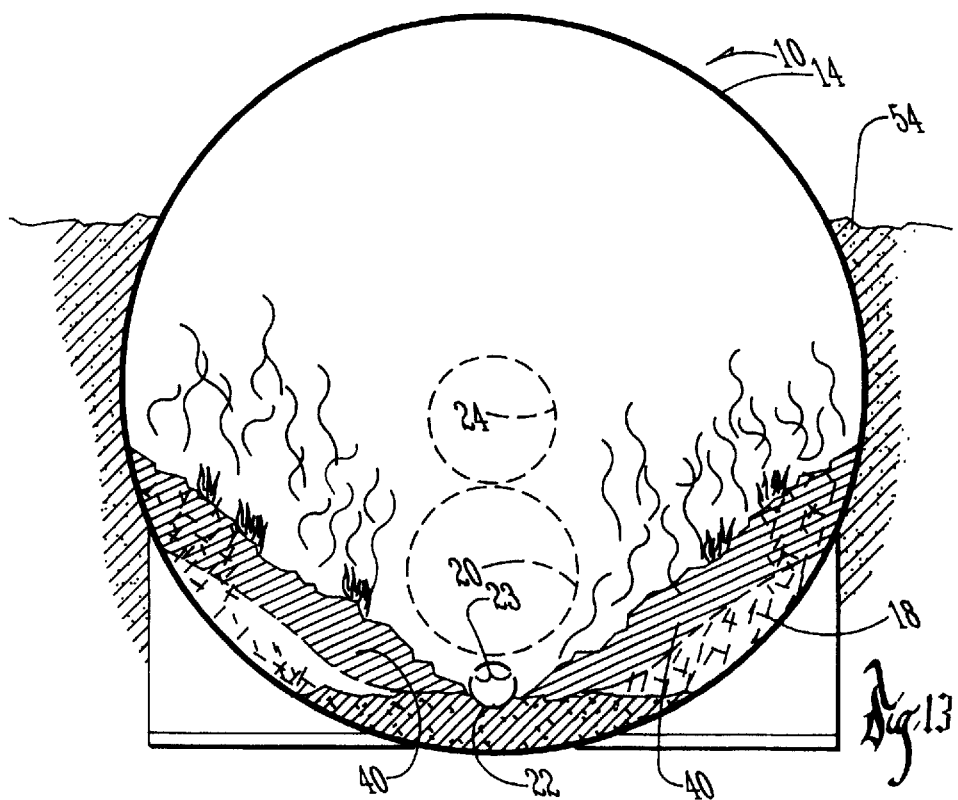

After the collapse, the fuel 18 burns as shown in FIG. 13. FIG. 13 shows unburned fuel 18 lying below burning fuel 40 which still causes flames in the firebox 14, although the flames are no longer completely surrounding the heat exchanger 20.

FIGS. 6–13 show various stages of the burning of the fuel 18 using the furnace 10, although it is preferred that the optimum stage shown in FIG. 10 or 9 is maintained. By gradually adding fuel to the firebox 14, the stage shown in FIG. 10 or 9 can be maintained producing a maximum efficiency.

It is believed that the bridging effect shown in FIGS. 7–12 occurs because of the consistency of the fuel 18. With the appropriate mixture of animal waste and a combustible component, the consistency of the fuel 18 is such that by burning the fuel 18 from the inside, the fuel bridges over voids rather than simply collapsing as it burns. Other fuels do not burn like this, i.e. the prior art does not burn fuel from the inside out. The combustible component could include, for example, sawdust, shredded paper, wood chips, etc. It was discovered that this type of mixture bridges over voids. One example of a fuel 18 consists of a mixture of less than 50% of horse manure and greater than 50% of sawdust, although other ratios and types of bedding or waste produce a similar phenomena. For example, it is believed that certain compositions of hog or chicken waste and other materials may have the appropriate consistency to create the bridging effect. It is possible that waste from all types of animals may be burned in the furnace of the present invention. Also, the combustible material which is mixed with the waste could be any type of combustible material. The make-up of the material used in the furnace could inherently bridge over voids and could be comprised of a by-product of an animal. The structure of the present invention may be valuable in burning all types of materials including manure without bedding, but optimal advantages seem to occur when a mixture of animal waste and a combustible material are used as fuel.

Other types of fuel may work with the present invention, even though some types of fuel may not smolder, therefore requiring an igniter. In addition to creating a bridging effect, the combustible material, for example, sawdust within the animal waste also helps in the burning of the fuel 18. The heat produced by the fuel 18 is believed to come from the burning waste, the burning bedding, and the methane and other gases such as ammonia and nitrous oxides produced by the organic animal waste.

Figure 2:
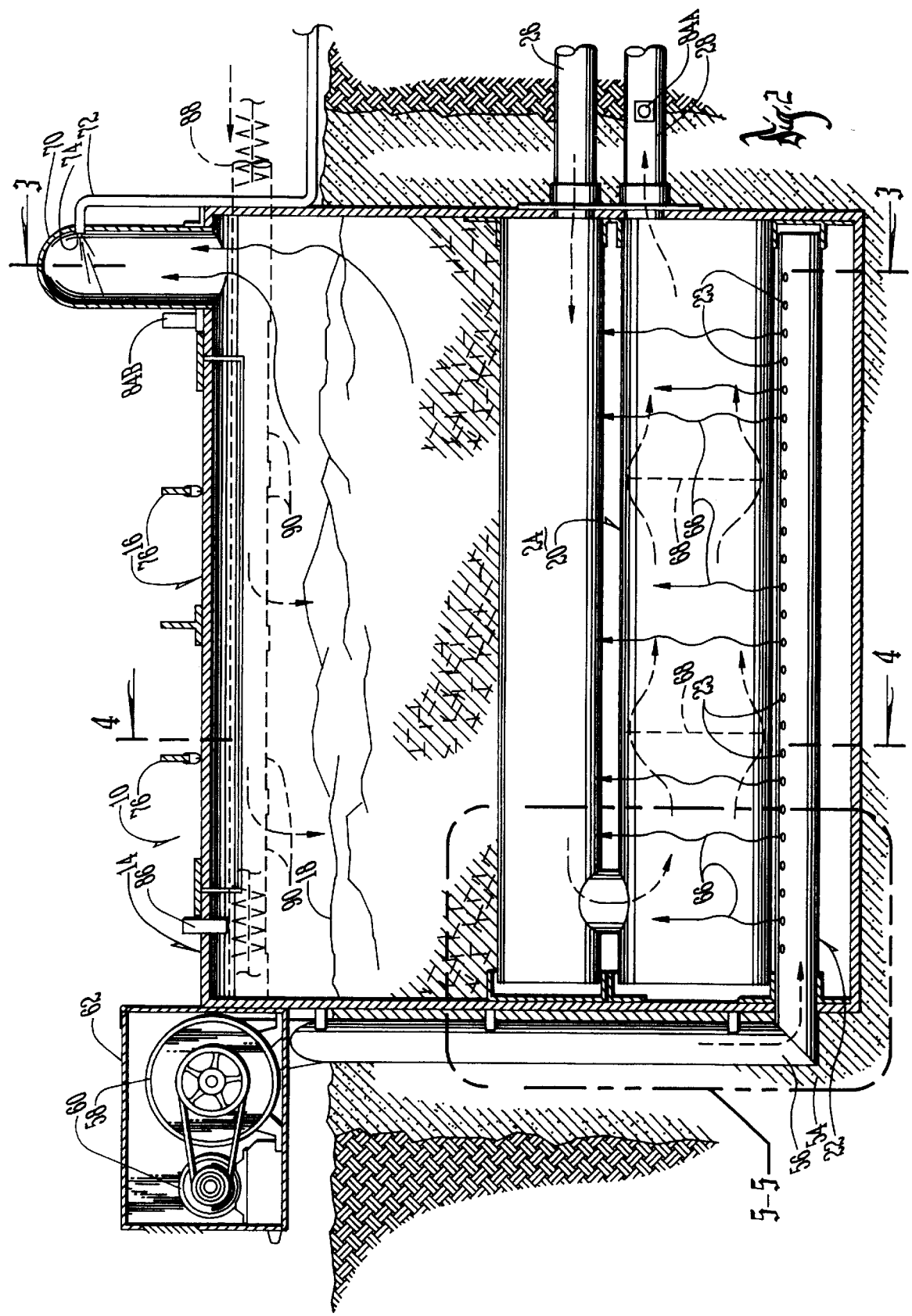
FIG. 2 is an enlarged cross section taken along lines 2—2 of FIG. 1.

FIGS. 2–5 show the furnace 10 in more detail. FIG. 2 is a cross section of the furnace 10 showing the firebox 14 buried partially in a layer of sand 54. The sand functions much like a fire brick in a fireplace and also makes the installation of a furnace easier. The air injected into the firebox 14 through the air injector pipe 22 comes through an air tube 56 which is connected to a squirrel cage fan 58 connected to a motor 60 enclosed in a housing 62. When the fan 58 is turned on, air is forced through the air tube 56 and the air injector pipe 22 through the holes 23. This causes the air to flow generally in the directions shown by arrows 66 in the figures. Air blown in these directions cause the desired burning as described above and shown in FIGS. 9–13.

The heat exchanger 20 includes a number of baffles 68 (FIG. 3) used to cause the air to move through the heat exchanger 20 as shown by the dashed lines in FIGS. 2 and 5. This increases the efficiency of the heat exchanger 20, but are not essential. While the size of the heat exchanger can vary, the heat exchanger is preferably not so big (relative to the firebox) that the appropriate bridging does not occur.

The exhaust gases created by the burning fuel escape through the air passageways 42 and ultimately escape through a chimney 70. The furnace 10 may include a source of water 72 connected to a nozzle 74 which sprays a fan of water into the chimney 70 perpendicular to the length of the chimney 70. This is shown best in FIGS. 2 and 3. The purpose of the fan of water is to cause any ashes or debris rising through the chimney to fall back into the firebox 14. This results in a cleaner burning furnace 10 and reduces the risk of catching nearby objects on fire. If the furnace 10 is used in areas requiring strict pollution guidelines, conventional scrubbers or other emissions processing equipment may be installed.

Figure 3:
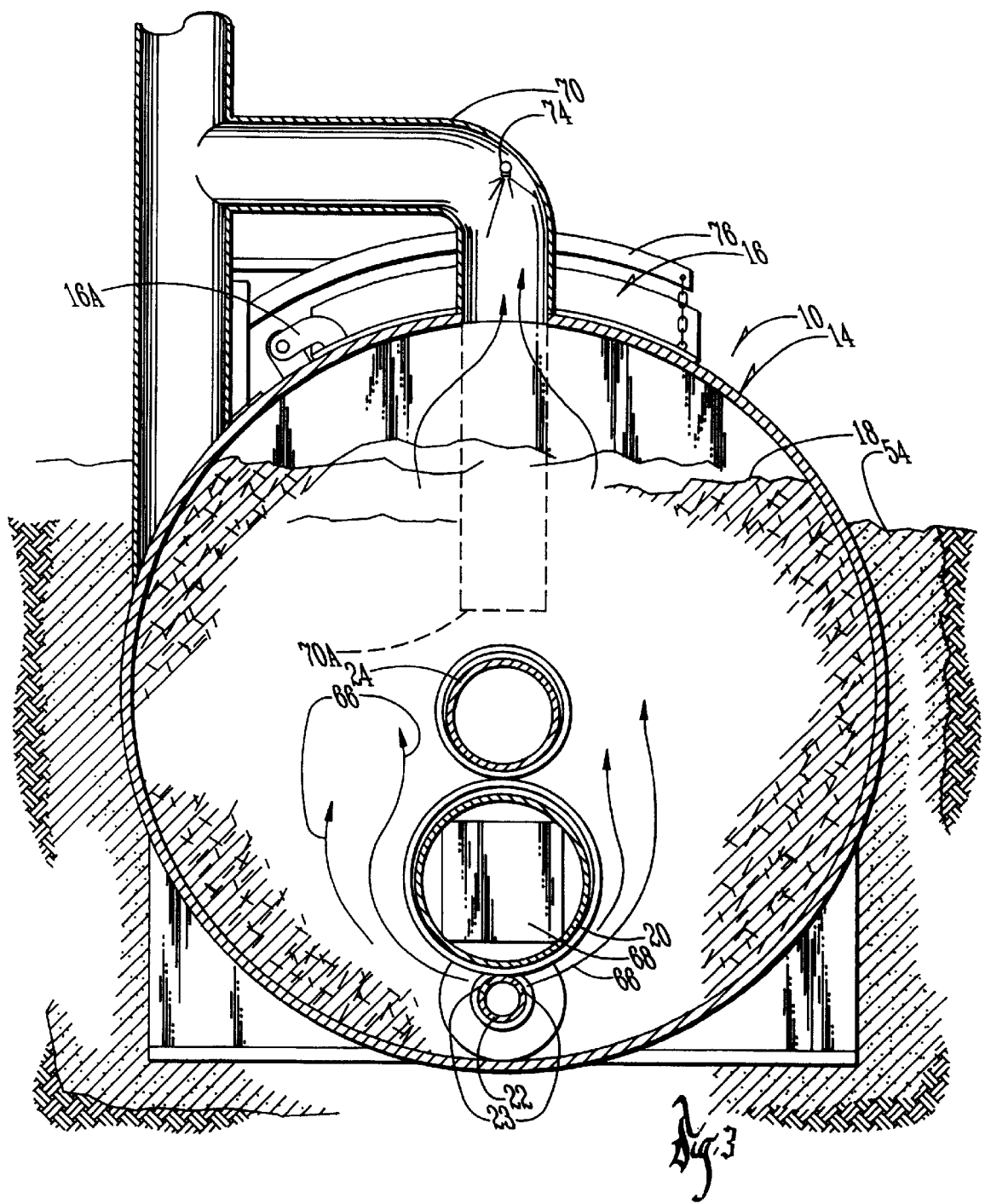
FIG. 3 is a cross section taken along lines 3—3 in FIG. 2.

An alternative chimney 70 includes a chimney inlet tube 70A which extends down into the firebox 14 as shown by dashed lines in FIG. 3. It is believed that a chimney with a chimney inlet 70A will cause the fuel 18 to burn more efficiently. The chimney inlet 70A will cause the exhaust gases to exit the firebox 14 near the cylindrical burn so that the gases will not have to travel through the fuel to escape. This will reduce or eliminate the air passageways 42 and the exhaust port holes 44 eliminating the hot spots on the firebox walls and increasing the efficiency of the furnace 10. The chimney inlet 70A may also improve the burning of very wet fuel by helping the bridging effect. The chimney inlet 70A may be comprised of a solid metal tube or a wire mesh, for example. The chimney inlet 70A may also be detachable from the chimney 70 or adjustable in length.

Figure 4:
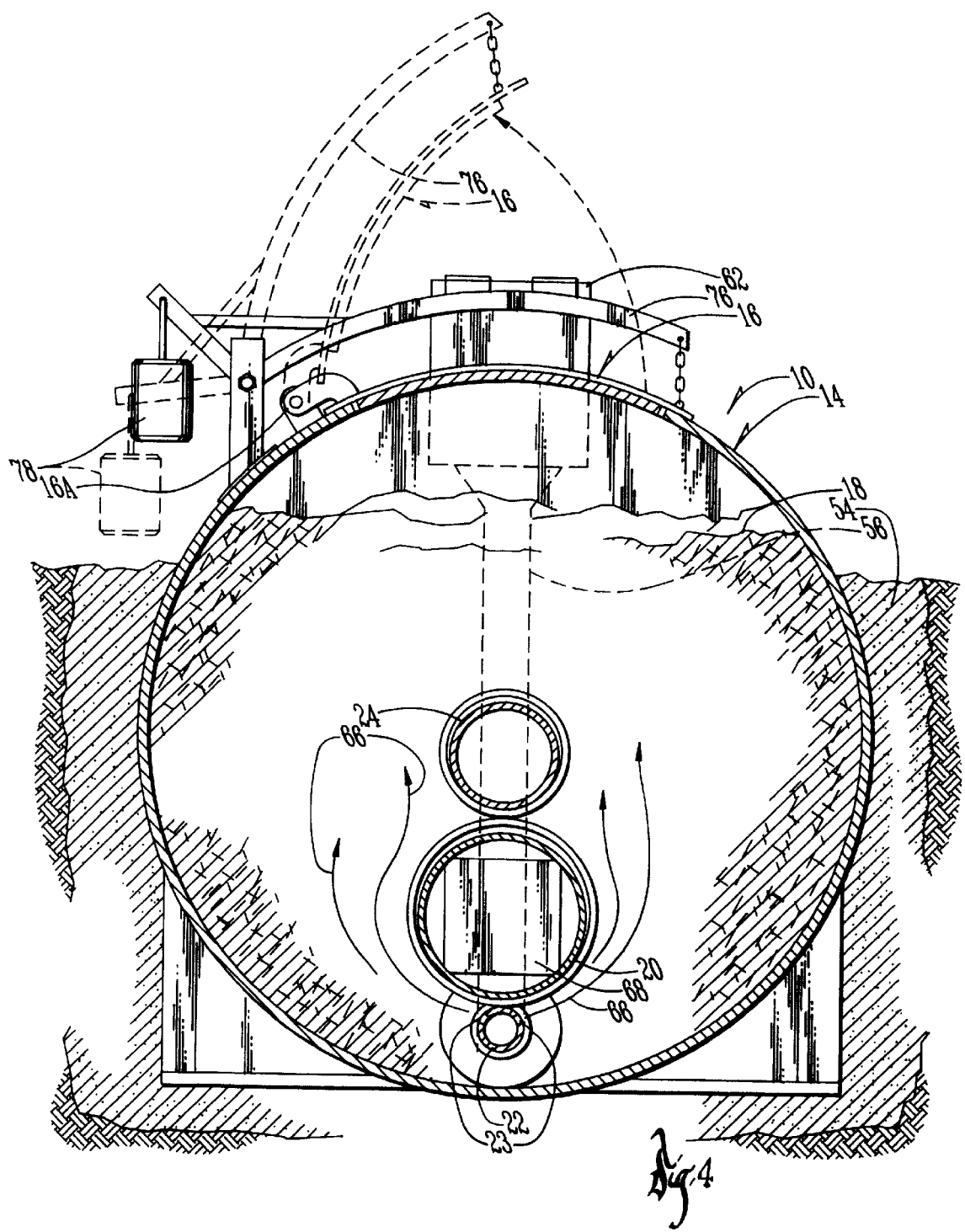
FIG. 4 is a cross section taken along lines 4—4 in FIG. 2.

FIG. 4 shows a view of the door 16 in the closed (solid lines) and open (dashed lines) positions. The door 16 is coupled to a pair of door support arms 76 which pivot upward. When the door support members 76 are raised upward, the door 16 rise along with them. A set of counter-weights 78 may be included to hold the door 16 in the open position for loading more fuel 18 into the firebox 14. For applications requiring a low amount of heat, a set of door springs could be used in place of the counter-weights 78.

When no oxygen is provided to the fuel 18 by the air injector holes 23, the preferred fuel goes into a dormant, sleep-like state and slowly smolders much like a silage fire. For example, the fuel 18 enclosed in the firebox 14 may smolder for months without completely burning up if no additional oxygen is injected into the firebox 14. The present invention takes advantage of this property to control the amount of heat put out by the furnace 10. When no additional heat is required, the fan 58 is turned off which stops the flow of oxygen through the air injector pipe holes 23 causing the fuel 18 to go into the dormant, smoldering state. When additional heat is desired, the fan 58 is activated which causes the fuel 18 to start burning almost instantaneously. As a result of this property, the burning stage shown in FIG. 9 (or any other stage) can be turned on and off as heat is needed. While the fan circulating the air through the cold air return pipe 26 and the hot air pipe 28 will preferably remain activated continuously, the fan 58 will only be activated when additional heat is required. A thermostat located within the building 12 will cause fan 58 to turn on when the temperature drops below the threshold set by a user. Once the temperature rises above a threshold, the fan 58 stops causing the fuel 18 to go back to the dormant state.

As an optional safety measure, a pair of upper limit controls 84A and 84B are included. The first upper limit control 84A is located down stream from the heat exchanger 20, shown in the hot air pipe 28 in FIG. 2. When the upper limit control 84A indicates that the air temperature in the air pipe 28 exceeds a certain temperature (e.g. 200° F.) the fan 58 will be shut down reducing the amount of heat produced, regardless of the thermostat. The protects the ductwork and the heat register from excess heat. Similarly, the upper limit control 84B senses the temperature within the firebox 14 and shuts down the fan 58 if the temperature within the firebox 14 exceeds a certain level (e.g. 800° F.). The first upper limit control 84A may be located in several locations, including within the building 12.

Another optional safety device is the door kill switch 86 shown in FIG. 2. When the door 16 is opened, the kill switch 86 is activated causing the fan 58 to turn off. This reduces the heat within the firebox to reduce potential injury to a user who opens up the door 16 to the firebox 14.

FIG. 2 also shows an optional feature of the invention. To automate the filling of the firebox 14, an auger 88 may be included. The auger 88 is preferably comprised of a stainless steel tube and flight. The auger 88 extends across the whole length of the firebox 14. The opposite end of the auger 88 (not shown) terminates at a source of fuel 18 and moves fuel from the source of fuel into the firebox 14. A number of holes 90 are formed in the tube of the auger 88. The fuel 18 will fall through the holes as the flight of the auger moves the fuel past the holes.

Another optional feature of the invention involves collecting methane gas from a long-term waste storage area. The collected methane could then be injected into the furnace 10 with the air through the air injector pipe 22. This would increase the heat generated and reduce the amount of methane and other inert gases released into the atmosphere.

Although the present invention has many applications, the preferred use of the furnace 10 is for heating a horse or livestock barn or an indoor arena. It is believed that a typical 15-stall horse barn will provide enough fuel for the furnace 10 to heat the horse barn for a period of about 4 months, which covers a typical winter. This saves the farmer the cost of manure disposal plus the cost of heating the barn.

For the purposes of this description, the term "heat exchanger" includes any device for drawing heat from one place to another place. For example, the heat exchanger 20 could include a boiler or a device for changing heat into mechanical energy. It is believed that the furnace 10 could be configured to power a steam turbine or the like to generate electricity. The furnace 10 could also be used simply as an incinerator. The furnace 10 could also power an air conditioner.

While the present invention would operate sufficiently using components of various dimensions, the dimensions are as follows. The firebox 14 is 8 feet in diameter and approximately 10 feet long. The heat exchanger 20 is 24 inches in diameter while the cold air pipe 24 is 18 inches in diameter. The pipes 26 and 28 are 15 inches in diameter. The firebox and the components within the firebox are preferably comprised of heavy steel. However, other materials may be used such as composite materials which are lighter, stronger, or have better heat withstanding properties. The firebox 14 and various components could also be comprised of a lighter iron material lined with a liner material providing a heat resistant coating on the inside and/or outside surfaces. Using a heat resistant coating may cut the weight of the furnace 10 in half while still being able to withstand temperatures up to 4,000° F. The pipe 28 is preferably comprised of steel near the firebox 14, but could change to a lighter steel further downstream from the firebox 14. The preferred exhaust system is shown as chimney 70, although it would be possible to include an exhaust system that recirculates the exhaust to improve the efficiency of the furnace 10. The preferred fuel could also be created by mixing sawdust or another material with animal waste if the animal waste to be disposed contains no bedding material, for example.

The furnace 10 of the present invention also burns cleanly. While heating a barn or other building with a conventional heater (burning fossil fuels) causes a significant amount of air pollution in the form of carbon monoxide, etc., burning fuel comprised of organic farm bedding waste produces mainly carbon dioxide and water vapor. While the production of carbon dioxide may seem undesirable, the same amount of carbon dioxide is released by organic waste decomposing naturally as is given off by burning it, just at different rates. As a result, the net pollution caused by the furnace 10 while burning organic farm bedding waste is nominal. In addition, since the furnace 10 burns at very high temperatures, there is little or no odor created by the burning fuel.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. An apparatus for burning organic material comprising:
   a support to receive and support a pile of organic material, the support including a bottom surface and side surfaces extending upward from the bottom surface forming a combustion space;
   an air injector positioned proximate the bottom surface and between the side surfaces of the support, and connectable to a source of pressurized air;
   combustion ignition locations proximate the air injector;
   a heat exchanger coupled to the support, the heat exchanger being disposed above the air injector and at least partially within the combustion space such that the heat exchanger is disposed at least partially within the pile of organic material, the heat exchanger including a conduit through which air is forced; and
   wherein the air injector causes the organic material to burn on the inside of the pile near the heat exchanger.

2. The apparatus of claim 1 wherein the support is a substantially enclosed container.

3. The apparatus of claim 2 wherein the container is a firebox.

4. The apparatus of claim 1 wherein the apparatus is used to heat a building.

5. The apparatus of claim 1 wherein the organic material is comprised of a mixture of animal waste and a combustible material.

6. The apparatus of claim 5 wherein the combustible material is comprised of a cellulose material.

7. The apparatus of claim 6 wherein the cellulose material is comprised of sawdust.

8. The apparatus of claim 1 wherein the pile of organic material surrounds the heat exchanger.

9. The apparatus of claim 1 wherein a portion of the organic material is disposed within the combustion space above the heat exchanger.

10. The apparatus of claim 1 further comprising a chimney inlet extending into the combustion space for allowing exhaust gases to exhaust from inside of the pile of organic material.

11. An apparatus for burning a fuel comprising:

a firebox having a plurality of walls defining a combustion space;

an elongated air injector disposed within the firebox for injecting air into the firebox;

a heat exchanger disposed within the combustion space of the firebox above and generally parallel to the air injector; and wherein the fuel to be burned is piled in the combustion space over the air injector and heat exchanger such that the fuel burns from the inside out when air is injected through the air injector.

12. The apparatus of claim 11 wherein the air is injected through a plurality of holes formed in the air injector.

13. The apparatus of claim 11 wherein the heat exchanger includes a conduit through which air is forced.

14. The apparatus of claim 13 wherein the heat exchanger is used to heat a building.

15. The apparatus of claim 11 further comprising:

a chimney in communication with the firebox for allowing exhaust gases to exit the firebox; and an chimney inlet in communication with the chimney and extending downward into the combustion space.

16. The apparatus of claim 15 wherein the chimney inlet extends substantially into the combustion space.

17. An apparatus for burning a fuel comprising:

a firebox having a plurality of walls defining a combustion space;

an air injector disposed within the firebox for injecting air into the firebox;

a heat exchanger disposed within the combustion space of the firebox above the air injector, the heat exchanger including a conduit through which air is forced; and wherein the fuel to be burned is piled in the combustion space over the air injector and heat exchanger such that the fuel burns from the inside out when air is injected through the air injector.

18. The apparatus of claim 17 wherein the air injector is elongated.

19. The apparatus of claim 18 wherein the heat exchanger is disposed generally parallel to the air injector.

20. The apparatus of claim 17 wherein the air is injected through a plurality of holes formed in the air injector.

21. The apparatus of claim 17 further comprising:

a chimney in communication with the firebox for allowing exhaust gases to exit the firebox; and an chimney inlet in communication with the chimney and extending downward into the combustion space.

22. The apparatus of claim 21 wherein the chimney inlet extends substantially downward into the combustion space.

23. An apparatus for burning a fuel comprising:

a firebox having a plurality of walls defining a combustion space;

an air injector disposed within the firebox for injecting air into the firebox;

a heat exchanger disposed within the combustion space of the firebox above the air injector;

a chimney in communication with the firebox for allowing exhaust gases to exit the firebox;

a chimney inlet in communication with the chimney and extending downward into the combustion space; and wherein the fuel to be burned is piled in the combustion space over the air injector and heat exchanger such that the fuel burns from the inside out when air is injected through the air injector.

24. The apparatus of claim 23 wherein the air injector is elongated.

25. The apparatus of claim 24 wherein the heat exchanger is disposed generally parallel to the air injector.

26. The apparatus of claim 23 wherein the air is injected through a plurality of holes formed in the air injector.

27. The apparatus of claim 23 wherein the heat exchanger includes conduit through which air is forced.

28. The apparatus of claim 27 wherein the heat exchanger is used to heat a building.

* * * * *